United States Patent [19]

Kim

[11] Patent Number: 4,712,992

[45] Date of Patent: Dec. 15, 1987

[54] EXTRUDER WITH SCREW HAVING CORE PORTION OF POLYGONAL CROSS-SECTION

[75] Inventor: Heung-Tai Kim, Avon Lake, Ohio

[73] Assignee: The B. F. Goodrich Company, Akron, Ohio

[21] Appl. No.: 873,646

[22] Filed: Jun. 12, 1986

[51] Int. Cl.$^4$ ............................................. B29C 47/60
[52] U.S. Cl. ............................... 425/207; 264/211.21; 264/211.23; 264/349; 366/79; 366/87; 425/209
[58] Field of Search ...................... 264/349, 68, 211.21, 264/211.23; 425/208, 209, 206, 207; 366/79, 87

[56] References Cited

U.S. PATENT DOCUMENTS

| | | | |
|---|---|---|---|
| 3,235,640 | 2/1966 | Carton et al. | 264/349 |
| 3,467,743 | 9/1969 | Otani | 264/211.23 |
| 3,511,479 | 5/1970 | Hendry | 425/208 |
| 3,661,363 | 5/1972 | Aletti | 425/208 |
| 3,954,366 | 5/1976 | Fields | 425/208 |

FOREIGN PATENT DOCUMENTS

| | | | |
|---|---|---|---|
| 2044364 | 7/1971 | Fed. Rep. of Germany | 425/207 |
| 54-65765 | 5/1979 | Japan | 264/211.21 |

*Primary Examiner*—Jeffery Thurlow
*Attorney, Agent, or Firm*—Joseph Januszkiewicz

[57] ABSTRACT

A screw for use in an extruder barrel for plasticizing plastic material from a solid phase to a viscous form wherein the feed screw has a cylindrical core with a helical flight extending for the full length of the screw. A selected portion or portions of the screw's core has a polygonal cross section whose apexes are parallel to the axis of rotation of such screws to thereby more precisely control the plasticizing action of the plastic material, its viscosity and temperature while providing a thoroughly mixed and homogeneous melt.

17 Claims, 8 Drawing Figures

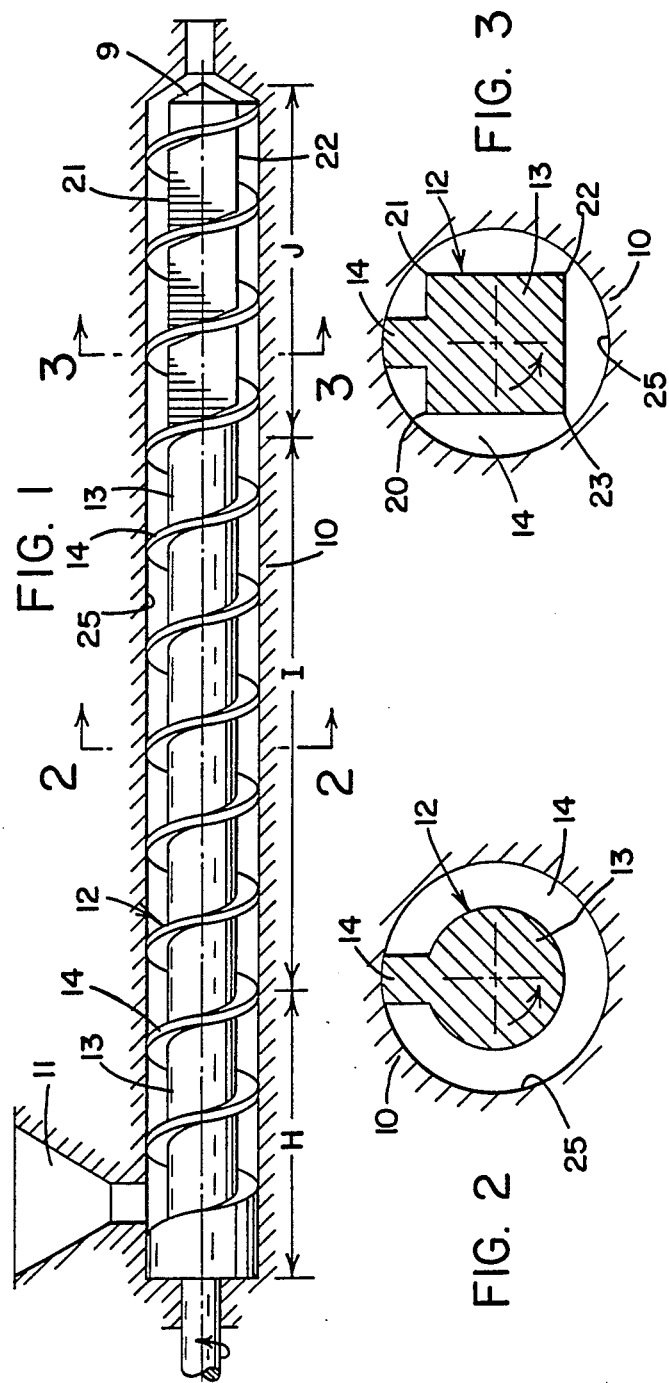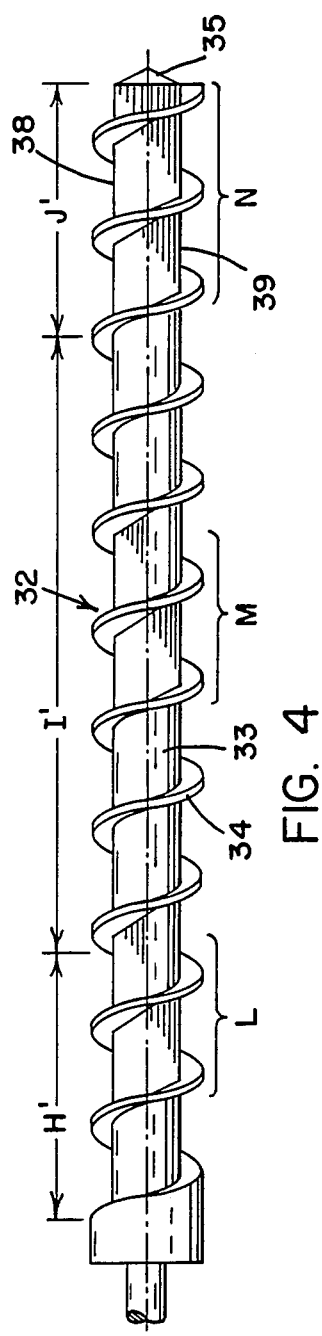

EXTRUDER WITH SCREW HAVING CORE PORTION OF POLYGONAL CROSS-SECTION

BACKGROUND OF THE INVENTION

The present invention relates to an extruder and more particularly to a new and improved extruder screw.

In the manufacture of thermoplastic materials, the extruder receives the plastic material in its hopper and delivers such materials to a feed screw located in the extruder barrel wherein the extruder screw advances and then works the plastic materials to produce a homogeneous extrudate.

To enhance the plasticizing process of an extruder screw, various configurations of screws have been made wherein the flights which define the channel depth may be dual flighted to increase the working action or the pitch of the flights have been varied or a portion of the screw section has decreasing channel depth to increase working. All of these variations, however, do not enhance the processing of heat sensitive compounds.

The present invention is concerned with enhancing the processing of heat sensitive compounds because of the necessity to obtain a thorough homogeneous mix without overheating the mix. It is critical in the processing of these compounds to maintain good flow through the extruder or mixer while achieving a homogeneous mix at a lower final temperature. The quality of the end product was the important key and thus it was essential to process such plastic material without raising the melt temperature during the process which otherwise would destroy its optimal morphological structure. Such novel processing of heat sensitive compounds provides for a thorough homogeneous mixing with a complete heat transfer to the entire melt while maintaining a low processing temperature during the processing action as well as a final low temperature at the die end.

SUMMARY OF THE INVENTION

A feed screw for an extruder wherein the core of the feed screw is of generally cylindrical cross section and has helical flights extending for the full length of the feed screw. The forwardly disposed metering section has a polygonal cross section with a plurality of circumferentially spaced apexes that cooperate with the extruder barrel and the helical flights to provide high shearing action at such apexes while the remainder of the screw to either side of the apex presents a low shearing action for a relatively long period of time.

BRIEF DESCRIPTION OF THE DRAWINGS

FIG. 1 is a side elevational view of an extruder screw mounted for rotation in an extruder barrel.

FIG. 2 is a cross sectional view of the extruder screw taken on line 2—2 of FIG. 1.

FIG. 3 is a cross sectional view of the extruder screw taken on line 3—3 of FIG. 1.

FIG. 4 is a side elevational view of a modified form of an extruder screw mounted for rotation in a cylindrical barrel.

DETAILED DESCRIPTION

Figure 5:
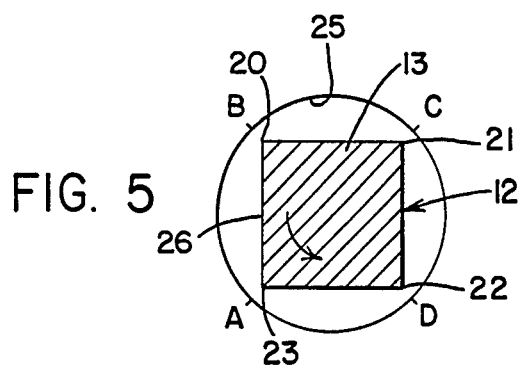
FIG. 5 is a cross sectional view of the polygonal portion of an extruder screw with the apexes of the screw designated on the extruder barrel for reference to depict its action.

Referring to the drawings, wherein like reference numerals designate like or corresponding parts throughout the several views, there is shown in FIG. 1 an extruder barrel 10, hopper 11 and an extruder feed screw 12. The feed screw 12 is driven or rotated by suitable transmission means not shown in a manner old and well known in the art. The feed screw has a feed section H, a transition section I, and a metering section J that terminates with its tip end 9 adjacent to the die (not shown) at the one end of the extruder. The extruder feed screw 12 has a core 13 with a helical land or flight 14 of a constant pitch for the entire length. The core 13 is circular in cross section except for the metering section J which is polygonal in cross section and, more specifically, square in cross section. Polygonal is a closed plane figure bounded by straight lines or a closed figure consisting of straight lines joined end to end. As shown in FIG. 3, which is a cross section of FIG. 1 taken on line 3—3 of the metering section, there is shown four edges 20-21-22 and 23. All of these edges are generally parallel lines or edges that run for the full length of the metering section defining apexes with channels therebetween. The inner surface of the extruder barrel 10, as seen in FIG. 3, is designated 25.

Figure 6:
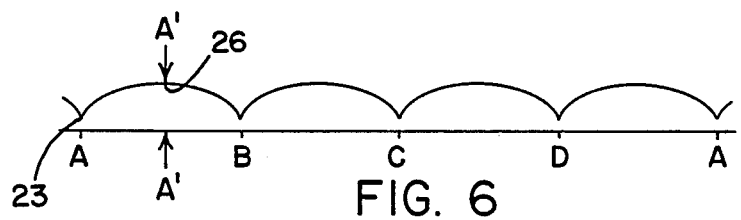
FIG. 6 is a developed view of shearing characteristics of the extruder screw as depicted by FIG. 5 for a full revolution of the screw from points A to D of the barrel.

Assuming that the extruder screw is in a stationary position, as shown in FIG. 5, the respective edges 20 through 23 of the feed screw are opposite fixed points A-B-C-D on the inner surface of the extruder barrel. To further explain the operation of the action of such feed screw, assume that a low shear compound is located in the barrel between the core 13 and the inner surface 25 of the barrel 10. As the feed screw 12 rotates counterclockwise, as viewed in FIG. 5, the low shear compound, at point A, receives the most shearing or working action from point 23 on the feed screw because of the small clearance space between the feed screw and the barrel. As point 23 moves past point A, the clearance space increases dramatically at point A until point 26 of the core 13 is opposite point A. During this moment of rotation, the plasticizing or working action of the core 13 would be at a minimum and is designated in FIG. 6 as the greatest amplitude on the curve between the two designated arrows A'. As the feed screw continues to rotate counterclockwise, the curve in FIG. 6 from point A' to B shows a very slow increase in working until point 20 of the feed screw reaches point A wherein there is again the least clearance and the most working action. Thus, FIG. 6 represents the working action of the metering sections as it rotates with the maximum amount of shear and working on the compound occurring when the radial clearance space is the least. Such working of the material generates sufficient heat which provides the necessary plastication of the heat sensitive polymer compound as the material is moved along the metering section without overheating the material. Such metering section maintains the polymer compound in a plastic state in a homogeneous mix at a low temperature without overheating. The ability to locate and control the shearing action and specific working action is materially increased by the ability to locate the number of working edges 20-21-22 and 23 with precision while maintaining a sufficient in-depth non-working action therebetween. Such action materially improves the kneading action of the screw without raising the melt temperature. Of particular advantage is the fact that the forward feeding action of the melt is maintained at such constant low melt temperature without raising such temperature. The critical feature being that such linear working edges provided a greater latitude of control over such temperature.

As an example of the precision control that the operation provides, one may consider the working action of the linear edges as that point in a 2-roll kneading mill as the nip of the rolls where the milling or kneading action takes places and the remainder of the roll as the non-working portion. In the two-roll mill, the material could pass the nip portion of the rolls several times before being ready for use because of its ideal mix and temperature condition; however, it is impossible to determine how many mill passes a given particle of the polymer material was subjected to whereas with the linear edges of the screw it is feasible to maintain an accurate control of the working as the melt is conveyed toward the die. Such linear edges perform their working and regulating function of conveying, mixing, shearing and temperature control much the same as a 2-roll mill where the material goes through a repeated cycle of high shear (short residence time), low shear (high residence time) as it moves forward. The low residence time would be the time period at the nip of the two-roll mill while the long residence time would be the time period for the remainder of the 360° rotation on the rolls. Thus, making the root of the feed screw rectangular or triangular (as to be described) has the material going through a high shear region for an instant whenever it goes through the apex of the root as at 20-21-22 or 23. Stated otherwise, the respective apexes 20 through 23 provide a force producing component that generates a working and plasticizing action on the melt or material being processed. As soon as the material goes past such low clearance apex regions, the material goes into a low shear region such as a channel between adjacent apexes where the screw depth is greater. This cycle is repeated every time the material goes through the apex. Thus, this type of screw design described with its linear edges functions as a control device for flow rate control which controls the work level put into the material which action also acts as a homogenizer while precisely controlling temperature. The placing of the linear edges at the metering action is a critical factor in processing heat sensitive compounds without overheating. Heat sensitive compounds have a relatively high viscosity because of the need to process them at low temperatures to prevent degradation, otherwise the heat sensitive compounds would overheat very easily.

A modification of the above described embodiment is shown in FIG. 4 wherein the feed screw is designated as element 32, having a feed section H', a transition section I', and a metering section J'. The extruder feed screw 32 has a core 33 with a helical flight 34 of constant pitch for the entire length of the screw with a tip 35 terminating at one end thereof.

Figure 7:
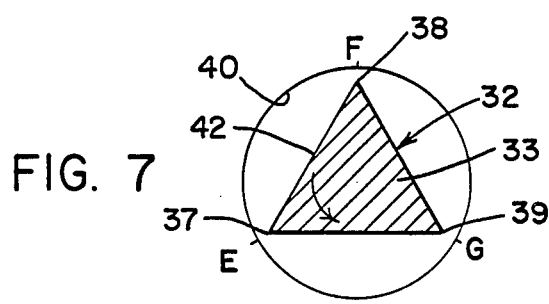
FIG. 7 is a cross sectional view of a modified form of the extruder screw showing the polygonal portion with the apexes of the screw designated on the extruder for reference to depict its action.

The core 33 is circular in cross section except for portions designated "L", "M", and "N". All of these sections are triangular in cross section presenting three linear edges 37, 38 and 39 which are force-producing components as described in the first embodiment with channels therebetween. As shown schematically in FIG. 7, the triangular shaped core 33 is disposed in cooperative action with the inner surface 40 of an extruder barrel. With the triangular configuration of core 33, it will be observed that the clearance space between the core 33 at its mid-point between apexes 37 and 38 designated as 42, is substantially greater than mid-point 26 of the square shaped core 13 which, together with only three apexes per full circumference of the feed screw versus four apexes as for the square shaped design of FIG. 5 of the first embodiment, provides for a greater modification of the working action of the feed in producing a lower melt temperature for the worked material.

Figure 8:
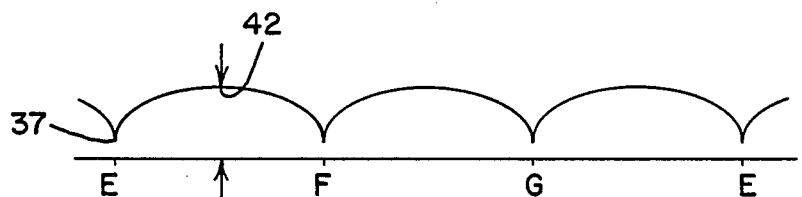
FIG. 8 is a developed view of shearing characteristics of the extruder screw as depicted by FIG. 7 for a full revolution of the screw from points E through F of the barrel.

With points E-F-G on the inner barrel surface 40 of the extruder barrel designated initially opposite respective apexes 37-38-39, rotation of the feed screw 32 will produce three high shear points for a full revolution of the feed screw. This action is shown in FIG. 8 which depicts the plasticizing action greatest at point E where the apex 37 provides the least clearance space between the barrel and such apex. The greatest clearance space at point 42 is even greater than the clearance space at point 26 as previously described with respect to FIGS. 5 and 6 of the first embodiment. As point 37 moves past point E, the clearance space increases dramatically until point 42 is opposite point E and then reduces slowly until point 38 is opposite point E thus producing a curve of work input depicted by FIG. 8. Such depiction of the working of the heat sensitive compound of FIG. 8 is typical of sections "L", "M", and "N" of the screw 32. The number of polygonal sections such as L, M or N can be varied as well as the number of planar sides of the polygon to provide for the necessary working of the compound to obtain the precise tolerances of temperature desired for the melt, its homogenity and its viscosity. These critical factors can be more evenly controlled with the design parameters as discussed above.

It will be apparent that, although a specific embodiment and certain modifications of the invention have been described in detail, the invention is not limited to the specifically illustrated and described constructions since variations may be made without departing from the principles of the invention.

I claim:

1. A screw conveyor for converting plastic material from the solid phase to a viscous or liquid form comprising a longitudinally extending core; circumferentially extending flight means mounted on one end portion of said core defining a feed section; circumferentially extending flight means mounted on the other end portion of said core defining a metering section; circumferentially extending flight means mounted on said core between said feed section and said metering section defining a melting section for plasticating such plastic material, changing said plastic material into a fluid phase; said core of said feed section and said melting section having a cylindrical cross-section; and said core of said metering section having a polygonal cross section presenting plasticating and force-producing components in cooperative action with said flight means.

2. A screw conveyor as set forth in claim 1 wherein said polygonal cross section of said core of said metering section defines a plurality of linear apexes that are parallel to the axis of rotation of said core.

3. A screw conveyor as set forth in claim 2 wherein said polygonal cross section is square presenting four linear edges, and the radial outer edges of said flights are a substantial greater distance from the longitudinal axial center line of said core than the radial outer edges of said four linear edges.

4. A screw conveyor as set forth in claim 1 wherein said flight means for said entire core length is a single continuous flight that extends from one end to the other end of said core.

5. A screw conveyor as set forth in claim 1 wherein said polygonal cross section is triangular presenting three linear edges for producing said force-producing components in cooperative action with said flight means on said core.

6. A screw conveyor for converting plastic material from the solid phase to a viscous or liquid form comprising a longitudinally extending core, a helical flight on said core extending continuously from one end of said core to the other end of said core, said core with said helical flight having one end portion terminating at said one end defining a metering section, said core with said helical flight having an intermediate portion extending downstream and terminating at said metering section defining a melt section, said core with said helical flight having the other end portion beginning at said other end of said core and terminating as said melt section defining a feed section, the core of each of said sections having a portion of its length cylindrical in cross-section and the remaining portion of its length polygonal in cross-section.

7. A screw conveyor as set forth in claim 6 wherein each of said sections that are polygonal in cross section have edges that are parallel to the axis of said core, said polygonal portions with said helical flight are cooperative to define channels between said helical flights.

8. A screw conveyor as set forth in claim 7 wherein said portions of said core that are polygonal in cross section are disposed downstream in each of said sections.

9. A screw conveyor as set forth in claim 8 wherein said polygonal shaped portions are square in cross section.

10. A screw conveyor as set forth in claim 8 wherein said polygonal shaped portions are triangular in cross section.

11. A screw conveyor for converting plastic material from the solid phase to a viscous or liquid form comprising a core, a helical flight on said core extending continuously from one end of said core to the other end of said core, a plurality of spaced portions of said core being circular in cross section, the remaining spaced portions of said core being polygonal in cross section, said polygonal portions having a plurality of apexes generally parallel to the axis of said core, and said polygonal portions cooperative with said helical flight to define a continuous channel.

12. An extruder having a housing with a cylindrical bore extending longitudinally therethrough; said cylindrical bore having a smooth surface; a screw conveyor journaled in said cylindrical bore for converting plastic material from the solid phase to a viscous or liquid form; said screw having a core; a circumferentially extending flight means encompassing said core for the full length thereof; one end portion of said core with the flight means encompassing such portion defines a feed section; the other end portion of said core with the flight means encompassing such portion defines a metering section; said core between said feed section and said metering section cooperative with the flight means encompassing such portion to define a melting section for plasticating such plastic material, changing said plastic material into a fluid phase; said core of said feed section and said melting section having a cylindrical cross-section; and said core in said metering section having a polygonal cross section presenting plasticating and force-producing components on such plastic material in any one turn of said flights in cooperative action with said flights of said metering section.

13. An extruder as set forth in claim 12 wherein said polygonal cross section has a plurality of planar surfaces that terminate into apexes that are spaced from said flights, and said apexes are spaced from said surface of said bore to provide a clearance space between all apexes and said surface of said bore.

14. An extruder as set forth in claim 13 wherein said apexes of said polygonal shaped metering section are of a lesser distance from the axial center line of said core than the outermost radial edges of said flights on said metering section.

15. A screw conveyor as set forth in claim 12 wherein said polygonal cross section is square presenting four linear edges which are parallel to the axis of rotation of said core for producing said force-producing components; and the apexes of said square cross section are of a lesser distance from the axial center line of said core than the outermost radial edges of said flights on said metering section.

16. A screw conveyor as set forth in claim 12 wherein said polygonal cross section is triangular presenting three linear edges for producing said force-producing components.

17. An extruder having a housing with a cylindrical bore extending longitudinally therethrough; said cylindrical bore having a smooth surface for its entire length; a screw conveyor journaled in said bore for rotation and for converting plastic material from the solid phase to a viscous or liquid form; said screw conveyor having a core with one end at one end of said cylindrical bore and the other end terminating at the other end of cylindrical bore; said screw conveyor having helical flight means extending continuously from one end of said core to the other end of said core, a plurality of spaced portions of said core being circular in cross section, the remaining spaced portions of said core being polygonal in cross section, said polygonal portions having a plurality of apexes generally parallel to the axis of said core, and said polygonal portions cooperative with said helical flight to define a continuous channel.

* * * * *